United States Patent [19]

Crossman

[11] 4,433,758

[45] Feb. 28, 1984

[54] BRAKE ADJUSTER HAVING A ROD DRAWN THROUGH A DRAW RING

[75] Inventor: Richard L. Crossman, Tallmadge, Ohio

[73] Assignee: Goodyear Aerospace Corporation, Akron, Ohio

[21] Appl. No.: 933,321

[22] Filed: Aug. 14, 1978

[51] Int. Cl.³ .............................................. F16D 65/52
[52] U.S. Cl. ............................ 188/196 R; 192/111 A
[58] Field of Search .............. 188/71.8, 196 R, 196 P; 192/111 A

[56] References Cited

U.S. PATENT DOCUMENTS

| | | | |
|---|---|---|---|
| 2,886,140 | 5/1959 | Trevaskis | 188/196 R X |
| 3,534,834 | 10/1970 | Sankey | 188/71.8 X |
| 3,903,999 | 9/1975 | Ditlinger | 188/71.8 X |

FOREIGN PATENT DOCUMENTS 811505 4/1959 United Kingdom ............ 188/196 R

Primary Examiner—Douglas C. Butler
Attorney, Agent, or Firm—P. E. Milliken; E. W. Oldham; R. L. Weber

[57] ABSTRACT

A brake adjuster wherein a solid or fluted rod is connected between the return mechanism and the pressure plate of a brake assembly. The rod passes through a draw ring of slightly less diameter than the major diameter of the rod. The draw ring may be part and parcel of, or operatively connected to, the spring follower. The rod is drawn through the draw ring under force imparted by the pressure plate on brake wear action, the draw ring swaging and reshaping the rod as the rod extends to compensate for brake wear. The rod may be either a smooth, solid one, or it may be fluted or ribbed.

8 Claims, 4 Drawing Figures

BRAKE ADJUSTER HAVING A ROD DRAWN THROUGH A DRAW RING

BACKGROUND OF THE INVENTION

The invention herein lies in the art of braking systems and specifically in that of braking systems for aircraft. At the present, it is standard to utilize a plurality of brake disks, alternately keyed or splined to the axles and hubs of aircraft wheels, to achieve the imparting of a braking force to the wheels. The brake disks presently used have been quite satisfactory for their heat dissipating characteristics, but it has been found that the same have a tendency to wear and that continual adjustments are necessary to guarantee that brake pedal travel and brake force are substantially consistent with braking effort irrespective of the wear experienced by the brake disk stack. Such adjustment is also required to achieve maximum usage of the brake disks. It is most desirable that these adjustments be made on a continuing basis rather than periodically such that, for every braking effort, brake pedal travel and brake force bear the same relationship to each other.

Numerous approaches have been taken in the art to achieve the desired brake adjustment. It is presently known to use various standard types of adjusters wherein the adjustment technique is accomplished by a frictionally slidable unit maintained upon a tube. Using the standard brake adjuster mechanism, it has been found that a wide variance of loads exists for any given distance of brake pedal travel or brake application. That is, the force versus displacement curves of the present standard types of adjusters do not trace each other on successive brake applications as the brake disks wear. Indeed, the force necessary to overcome the frictional engagement between the tube and slidable unit varies with each brake application.

Another shortcoming utilizing the standard brake adjusters of the prior art is that static and dynamic coefficients of friction characterize the relationship between the tube and slidable unit. When brake pressure is initially applied, the first amount of travel experienced by the return mechanism is that known in the art as the built-in clearance. The next portion of travel is that compensating for the wear experienced during each braking effort. Above this, the force applied is that known as the effective brake force, i.e. the force actually being applied to stop the aircraft. However, with the static coefficient of friction being greater than the dynamic coefficient of friction, the force applied to effectuate movement of friction-based adjusters to compensate for brake wear must be sufficient to overcome both coefficients of friction and the return spring brake on force. Should the standard unit slip, the spring follower may then return to a point where there is no longer a built-in clearance. In such a case, the brake either remains in a locked position or, at best, suffers a loss of built-in clearance for subsequent brake applications.

Numerous approaches have been taken to resolve the problems inherent with the present standard brake adjusters. Teachings of such approaches are found in U.S. Pat. Nos. 2,888,109, and 3,542,165. Other teachings of some significance are found in U.S. Pat. Nos. 3,376,959; 3,958,670; and 3,990,547. Yet further, applicant's own U.S. Pat. No. 3,926,283, shows another novel approach toward a resolution of the problems presently existent in the art. The teachings of the foregoing prior art are of general interest with respect to the invention presented herein, but are not seen as particularly pertinent since such teachings themselves have inherent drawbacks. It will become apparent hereinafter that the instant invention provides significant advantages over these prior art teachings.

OBJECTS OF THE INVENTION

In light of the foregoing, it is an object of the instant invention to present a brake adjuster wherein unreliable and unpredictable frictional forces are minimized.

Another object of the invention is to present a brake adjuster which is repeatable in operation with respect to consecutive brake applications.

Yet another object of the invention is to present a brake adjuster which may be retrofit into presently existing braking systems, thereby increasing the reliability of such systems with minimal expense.

Still a further object of the invention is to present a brake adjuster which is simplistic in design, reliable in operation, inexpensive to construct, and readily conducive to implementation in the art.

SUMMARY OF THE INVENTION

The foregoing objects and other objects of the invention which will become apparent as the detailed description proceeds are achieved by a brake adjuster assembly for interconnection between the pressure plate and brake housing of a wheel of a vehicle, comprising: a support member maintained in fixed relationship to the brake housing; reciprocating means operatively associated with said support member for reciprocating movement between first and second ends thereof; a draw ring carried by said reciprocating means and movable therewith; and a rod passing through said draw ring and connected at one end thereof to the pressure plate, said draw ring being in swaging and reshaping engagement with said rod.

DESCRIPTION OF THE DRAWINGS

For a complete understanding of the objects, techniques, and stucture of the invention, reference should be had to the following detailed description and accompanying drawings wherein.

DETAILED DESCRIPTION OF PREFERRED EMBODIMENTS

Figure 1:
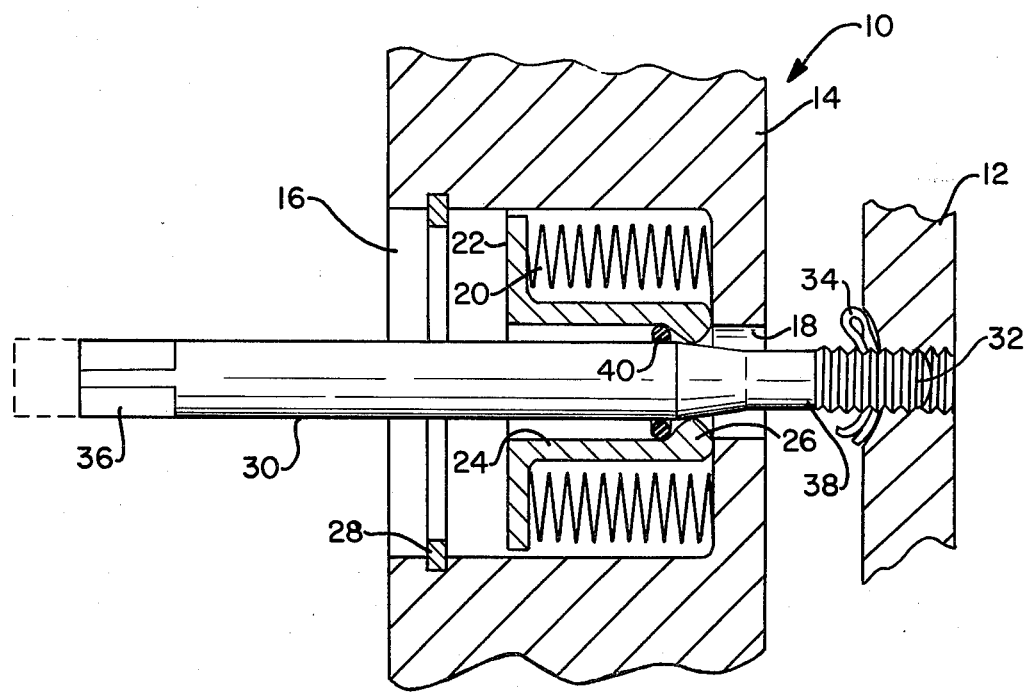
FIG. 1 is a cross-sectional view of an embodiment of the invention utilizing a solid rod and wherein the brake adjuster is maintained within the brake housing itself.

Referring now to the drawings and more particularly FIG. 1, it can be seen that a brake adjuster assembly is designated generally by the numeral 10. In somewhat standard fashion, the assembly 10 is operative between the pressure plate 12 and the brake housing 14. Of course, the pressure plate 12 is operative for engagement with a brake disk stack (not shown) to achieve the necessary forceful engagement between the various disks to effectuate the braking effort.

As shown, the brake housing 14 is characterized by a cavity 16 drilled, molded, or otherwise placed therein. The cavity 16 is preferably of circular cross-section, sharing a common center line with the opening 18 passing through the housing 14 on the side adjacent the pressure plate 12. As seen, the opening 18 communicates with the cavity 16.

Maintained within the cavity 16 is a Belleville spring 20 which makes operative engagement between a flange 22 of a spring follower 24 and the bottom of the cavity 16. While a helical spring might be used, the Belleville spring 20 is preferred for packaging purposes. As is known in the art, a Belleville spring will generally impart a greater force for a given displacement than will a helical spring and thus the size of the housing 14 and depth of the cavity 16 may be minimized. Further, a Belleville spring does not have the undesirable tendency to wind or twist on compression and expansion as do helical springs.

Maintaining the spring follower 24 within the cavity 16 is a keeper ring or washer 28. The keeper ring restricts the movement of the spring follower 24 against the biasing or urging of the Belleville spring 20. Indeed, with no brake pedal actuation moving the pressure plate 12, the flange 22 of the spring follower 24 abuts the keeper 28.

One particular point of novelty in the instant invention is the forming of a draw ring 26 at one end of the spring follower 24, that end being adjacent to and in communication with the opening 18. Passing through the spring follower 24, and in swaging and reshaping engagement with the draw ring 26 is a solid rod 30 of circular cross-section. The pressure plate 12 is tapped and threaded for receiving mating threads 32 at one end of the rod 30. A woodruff key slot and cotter key 34 or other securing means is provided for fixedly securing the end of the rod 30 to the pressure plate 12 and restricting an unthreading of such engagement. As shown, the other end of the rod 30 is formed as at 36 to receive a wrench, socket, or the like to facilitate threading of the rod 30 into the pressure plate 12. The rod 30 is further characterized by a neck 38 of less diameter than the remainder of the rod 30 and, further, of less diameter than the draw ring 26. This allows the rod 30 to be inserted through the spring follower 24, draw ring 26, and opening 18 to make threaded engagement with the pressure plate 12 during installation and assembly.

The rod 30 is of a diameter slightly greater than the inside diameter of the draw ring 26. With the brakes unapplied, the flange 22 rests on the keeper 28 and the pressure plate 12 is disengaged from the brake disk stack. Upon brake application, the pressure plate 12 moves toward engagement with the stack. The rod 30, being of slightly greater diameter than the inside diameter of the draw ring 26, is wedged within the draw ring and pulls the spring follower 24, against the biasing of the Belleville spring 20, to a point where the bottom of the spring follower 24 engages the bottom of the cavity. At this point, further movement of the pressure plate 12 in the braking effort draws the rod 30 through the draw ring 26, such action swaging and reshaping the rod 30. It will be appreciated that a first portion of force applied to the pressure plate 12 will bottom the spring follower 24 in the cavity 16 against the biasing of the Belleville spring 20. Following this movement, the force applied to the pressure plate 12 is the effective brake force, reduced by the adjustment force, that force necessary to draw the rod 30 through the draw ring 26 to compensate for the brake wear being experienced during the braking effort.

To minimize the adjustment force and to guarantee that such force is the same for each brake application, a wiper or O-ring 40 is maintained about the rod 30 to keep contaminants from passing into the area of interference between the draw ring 26 and the rod 30. Consequently, the adjustment load is predictable and repeatable. It will be understood that the amount of adjustment capable by the assembly 10 is determined by the length of the rod 30 and that the amount of force necessary to achieve such adjustment is determined by the structures of the draw ring 26 and the rod 30, and the relative diameters thereof. Still further, it will be noted that the engagement between the elements 26,30 is minimally frictional in that the rod 30 is swaged or reshaped by the draw ring 26 during the braking action; it is not merely a frictional sliding of the rod 30 through the ring 26.

Figure 2:
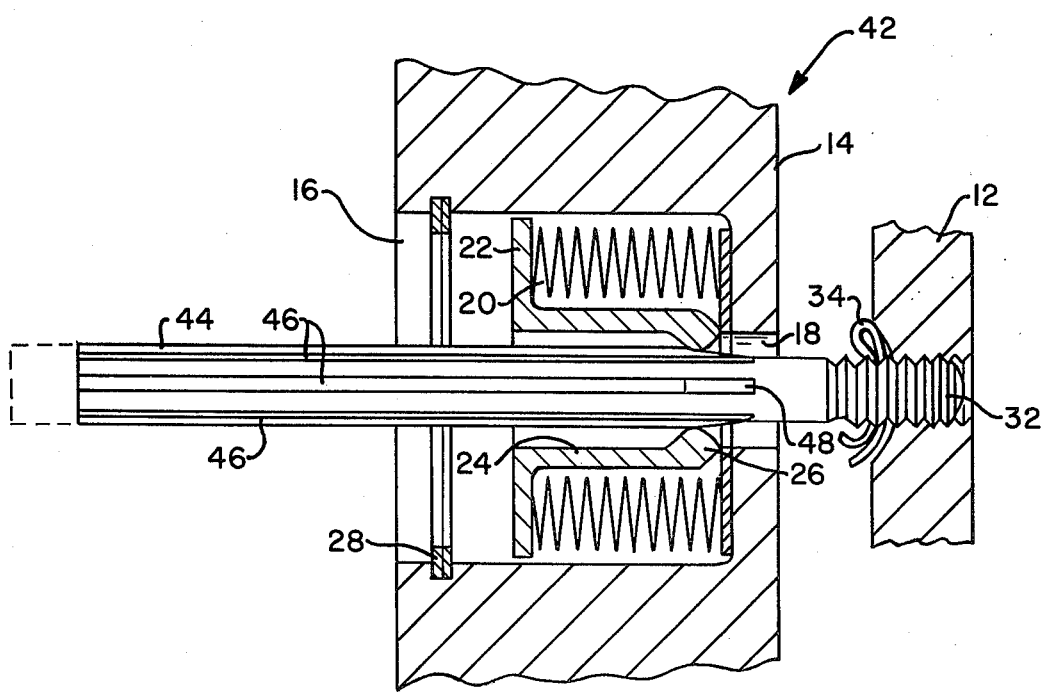
FIG. 2 is a cross-sectional view of an embodiment of the invention similar to that of FIG. 1 but wherein the solid rod is substituted with a fluted rod.

With reference now to FIG. 2, another embodiment of the invention is shown by the brake adjuster assembly 42. Again, there is a pressure plate 12, brake housing 14, cavity 16, and other such elements identified in FIG. 1 by corresponding reference numerals. However, in this embodiment, the rod 44 is not a smooth, solid, cylindrical rod as is the rod 30. The rod 44 is fluted, as characterized by a plurality of ribs 46 extending longitudinally along the rod 44 and protruding radially therefrom. The ribs 46 are beveled or tapered as at 48 to facilitate assembly much in the same manner as by the neck 38 in the assembly 10.

The fluted rod 44 has benefits over the solid rod 30 of the embodiment of FIG. 1. The recesses between the ribs 46 provide a place for contaminants to pass during the swaging or reshaping operation and, hence, there is no need for the wiper 40. Further, although frictional forces are quite small in the embodiment of FIG. 1, they are even less in the assembly 42 utilizing the fluted rod 44 since the recesses between the ribs 46 provide a place for the metal on the rib surfaces to flow during the swaging and reshaping operation. While in the assembly 10, there is an actual elongation of the rod 30 as the rod is effectively stretched through the draw ring 26, there is substantially no elongation of the rod 44 since the metal flows from the ribs 46 into the recesses therebetween as the rod passes through the draw ring 26.

It has been found that a suitable rod 44 may be constructed from a gear-tooth rod, the ribs 44 comprising the gear teeth. Indeed, in one embodiment of the invention, the rod 44 is a 24 pitch gear-tooth rod having the addendum removed to the pitch diameter. The inside diameter of the draw ring 26 is then formed at about 0.002 inches smaller than the pitch diameter to provide for interference between the ribs 46 and the draw ring 26.

It has further been found that using a fluted rod 44 rather than the solid rod 30, manufacturing tolerances are greatly increased. The provision of ribs 46 reduces the surface area contact with the draw ring 26 such that slight variations in the major diameter of the rod 44 and the inside diameter of the draw ring 26 do not increase the adjustment load anywhere near the amount that such load would be increased for similar variations in the assembly 10 of FIG. 1. Yet further, cocking of the rod 30 has been found to alter the adjustment load to a greater extent than such cocking in the assembly 42. This appears to be due to the reduced area of surface contact of the assembly 42, coupled with the provision of recesses between the ribs 46 allowing a place for the swaged metal to pass. Indeed, utilizing the gear-tooth rod set forth above, the surface area contact between the rod and draw ring in the assembly 42 is approximately one-half that of a similar structure of FIG. 1.

With further attention to the assembly 42 of FIG. 2, it will be appreciated that a star-type wrench could be used to engage the end of the rod 46 to make threaded engagement with the pressure plate 12 as discussed with respect to the embodiment of FIG. 1. Of course, the end of the rod 44 could be machined to provide a square head, hex head, or the like for receiving a standard wrench. In any event, except as discussed hereinabove, the structure and operation of the assembly 42 is quite similar to that of the assembly 10 previously considered. On successive brake applications, the rod 44 is drawn through the draw ring 26 under force imparted to the pressure plate 12. The rod 46 wedges itself into operationally secure engagement with the draw ring 26 for reciprocating action with the spring follower 24 at least through the maximum distance between the flange 22 and the keeper 28, the built-in clearance. Beyond this, relative movement between the rod 44 and spring follower 24 compensates for brake wear during the braking operation.

Figure 3:
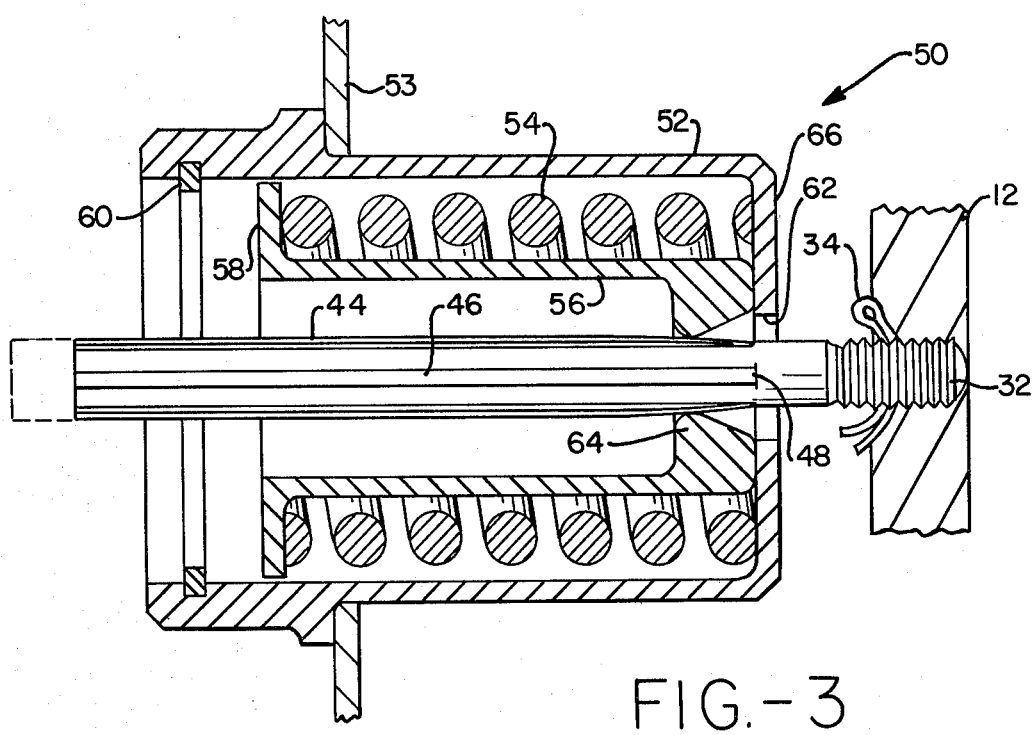
FIG. 3 is a sectional view of a retrofit brake adjuster according to the invention wherein the spring follower of a presently existing system is substituted with a modified spring follower.

The brake adjuster assembly 50 of FIG. 3 is shown as a retrofit type of assembly wherein a presently existing brake adjuster may be modified to achieve the benefits of the instant invention. In standard fashion, the assembly 50 includes a casing 52 secured to the brake housing 53. A helical spring 54 is maintained within the casing 52 in operative reciprocating engagement with a spring follower 56. Again, a flange 58 characterizes one end of the spring follower 56 and is retained within the housing 52 by means of a keeper ring 60. An opening 62 is provided in the casing end 66 and through which a rod may pass for connection to a pressure plate 12.

As just described, the system 50 is quite similar to systems presently utilized in the art. However, the spring follower 56 is one used to replace the spring follower presently used in the casing 52, the same being characterized by a draw ring 64 at the end thereof. Further, the means interconnecting the pressure plate 12 to the brake adjuster is now replaced with a fluted rod 44 characterized by the ribs 46 as discussed above. Threaded engagement is again made via the threads 32, and a woodruff key slot and cotter key 34 may be used for further securing of the rod 44 to the pressure plate 12. The character of the rod 44 and the draw ring 64 may be as discussed with respect to FIG. 2 and, of course, it will be understood that the retrofit of FIG. 3 might equally well be made using a solid rod as discussed with respect to FIG. 1. In any event, a presently existing brake adjuster may be modified by replacing the spring follower with a spring follower 56 having a draw ring 64 at one end thereof, and by replacing the pressure plate connecting means with a fluted rod 44 or solid rod 30, the same being in swaging and reshaping engagement with the draw ring 64. The cost of retrofit is thus minimized, but the benefits over presently existing systems are substantial.

Figure 4:
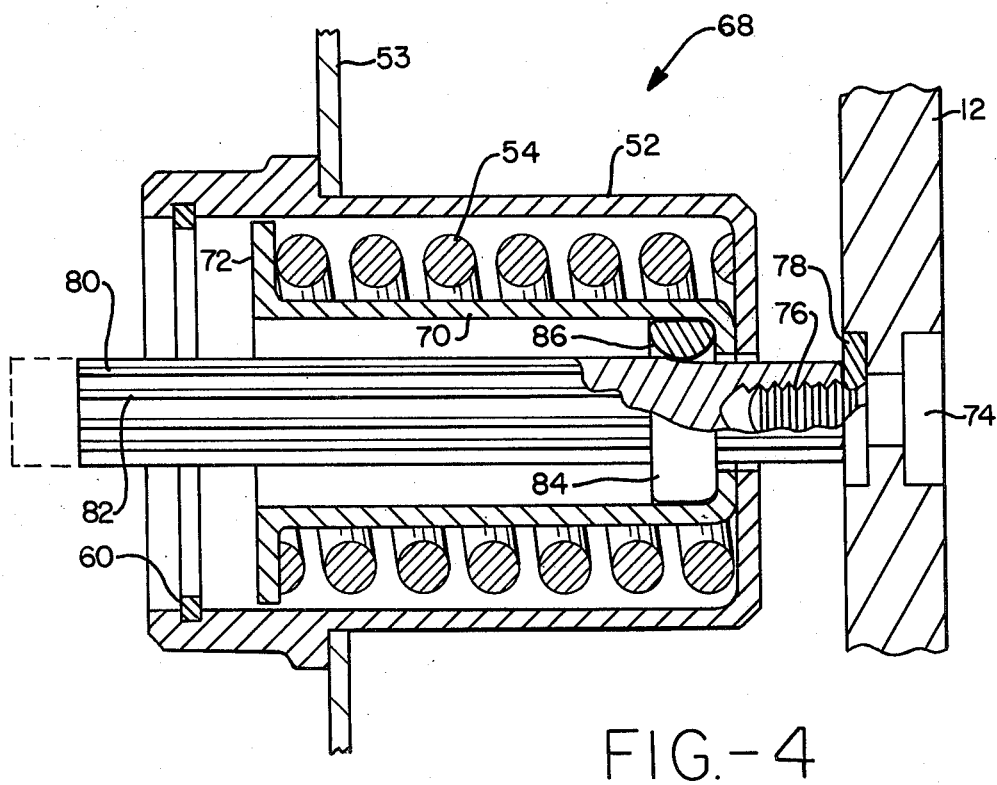
FIG. 4 is a sectional view of a retrofit brake adjuster according to the invention wherein a draw ring is added to a presently existing spring follower to modify the same for receiving a fluted rod.

The brake adjuster assembly 68 of FIG. 4 is yet another embodiment of a retrofit assembly wherein a minimum of components need to be replaced in a presently existing system to achieve the benefits of the instant invention. In this instance, the spring follower 70 is the original equipment which would be replaced in the assembly 50 of FIG. 3. A flange 72 characterizes the end of the spring follower 70 for purposes discussed hereinabove. In this instance, a bolt 74 secures a pressure plate 12 with a washer 78 to a fluted rod 80. The rod 80 is tapped and threaded as at 76 to receive the bolt 74. The rod 80, characterized by the longitudinal ribs or flutes 82, is used in the retrofit assembly 68 to replace the pressure plate connecting means in the presently existing system.

Also added to the existing brake adjuster to achieve the objects of the instant invention is a draw ring 84. This draw ring has an outside diameter equivalent to the inside diameter of the spring follower 70 and has an inside diameter slightly less than the major diameter of the rod 80. As can be seen in the cross-sectional view of FIG. 4, the draw ring 84 has a rounded contacting surface such that the area of contact 86 is small. Further, by rounding the rod-receiving surface of the draw ring 84, it is guaranteed that there is no cutting or broaching of the rod 80, but only a swaging or reshaping action takes place. It will further be noted that the rounding of the interior surfaces of the draw ring 84 are symmetrical about a center line, such that the manner of placement of the draw ring 84 into the spring follower 70 is not critical.

It should be readily appreciated that the embodiment of FIG. 4 is a simple, inexpensive, and yet reliable method of retrofitting presently existing brake adjusters to acquire the attributes of the instant invention. It will further be appreciated that the fluted rod 80 could easily be substituted by the solid rod 30 of the embodiment of FIG. 1, while remaining within the scope of the instant invention.

Preferably, all of the embodiments presented hereinabove incorporate a draw ring having a circular internal geometry with a rounded front edge for receiving a solid rod having either a smooth or fluted external surface. In operation, the draw ring swages, reshapes, or elongates the rod with a minimum of frictional forces being encountered. As mentioned above, the material of which the rod and draw ring are constructed is important to the operation of the invention, as is the amount of interference (difference in diameters) between the rod and draw ring. With respect to material, it has been found that it is most preferable that the rod be made of a 303 or 304 free-machined, annealed stainless steel with the draw ring being of a 440C stainless steel having a Rockwell hardness in the range of C40–45. With this type of material, it has been found that a 400 pound load is necessary to draw the fluted rod through the draw ring when there is an interference between the two on the order of 0.010–0.012 inches. In this embodiment, the fluted rod has a major diameter on the order of 0.25–0.375 inches. For the same load, with a solid rod having a smooth external surface, it has been found that the rod should have a diameter of 0.25 inches and that the interference between the rod and draw ring should be limited to 0.001–0.0015 inches. As can be seen, the manufacturing tolerances with the smooth, solid rod are much more critical than those using the fluted rod. This characteristic was discussed hereinabove.

It has also been found that the embodiments of the instant invention, utilizing both the fluted and smooth solid rod, are less affected in operation by temperature than are presently known devices. Utilizing the solid rods, there is a much greater mass to be heated-up in braking than in the presently existing systems utilizing tubes. Further, in the fluted rod embodiments, the ribs act as heat fins to assist in the dissipation of heat. Also, in the fluted rod embodiments, there is less contact area between the rod and the draw ring and, hence, less area of contact for heat conduction. This characteristic is important in light of the high temperatures at which aircraft braking systems operate.

Thus, it can be seen that the objects of the invention have been met with the structures presented hereinabove. Several embodiments of the invention have been presented for implementation as original equipment or retrofit assemblies. While in accordance with the patent statutes, only the best mode and preferred embodiments of the invention have been presented and described in detail, it is to be understood that the invention is not limited thereto or thereby. Consequently, for an appreciation of the true scope and breadth of the invention, reference should be had to the following claims.

What is claimed is:

1. A brake adjuster assembly for interconnection between the pressure plate and the brake housing of a wheel of a vehicle, comprising:
    a support member maintained in fixed relationship to the brake housing;
    reciprocating means operatively associated with said support member for reciprocating movement between first and second ends thereof;
    a draw ring carried by said reciprocating means and movable therewith;
    a rod passing through said draw ring and connected at one end thereof to the pressure plate, said draw ring being in swaging and reshaping engagement with said rod; and
    wherein said rod is a fluted rod having ribs thereon in said swaging and reshaping engagement with said draw ring.

2. The brake adjuster assembly according to claim 1 wherein said reciprocating means comprises a spring biased against a spring follower.

3. The brake adjuster assembly according to claim 2 wherein said draw ring is formed at one end of said spring follower as an integral part thereof.

4. The brake adjuster assembly according to claim 2 wherein said spring comprises a Belleville spring, said spring follower and Belleville spring being operatively maintained within a cavity in the brake housing.

5. The brake adjuster assembly according to claim 1 wherein said rod is threadedly engaged with the pressure plate at said one end thereof, and shaped at the other end thereof to receive means for effectuating said threaded engagement.

6. A brake adjuster assembly for interconnection between the pressure plate and brake housing of a wheel of a vehicle, comprising:
    a carrier member;
    a spring follower received by said carrier member and biased by a spring for reciprocating movement between two points within said carrier;
    a draw ring carried by said spring follower;
    a rod connected at one end thereof to the pressure plate and passing through said draw ring in reshaping engagement therewith; and
    wherein said rod is a fluted rod having ribs thereon in swaging and reshaping engagement with said draw ring.

7. The brake adjuster assembly as recited in claim 6 wherein said carrier comprises a cavity within the brake housing.

8. The brake adjuster assembly as recited in claim 7 wherein said draw ring comprises a portion of said spring follower and wherein said spring is a Belleville spring.

* * * * *